(12) United States Patent
Rossbach et al.

(10) Patent No.: US 12,526,872 B2
(45) Date of Patent: Jan. 13, 2026

(54) SURVIVAL TIME COMMUNICATION TECHNIQUES

(71) Applicant: Apple Inc., Cupertino, CA (US)

(72) Inventors: Ralf Rossbach, Munich (DE); Fangli Xu, Beijing (CN); Haijing Hu, Los Gatos, CA (US); Sarma V. Vangala, Campbell, CA (US)

(73) Assignee: Apple Inc., Cupertino, CA (US)

( * ) Notice: Subject to any disclaimer, the term of this patent is extended or adjusted under 35 U.S.C. 154(b) by 638 days.

(21) Appl. No.: 17/437,794

(22) PCT Filed: Apr. 23, 2021

(86) PCT No.: PCT/CN2021/089163
§ 371 (c)(1),
(2) Date: Oct. 27, 2022

(87) PCT Pub. No.: WO2022/222127
PCT Pub. Date: Oct. 27, 2022

(65) Prior Publication Data
US 2023/0269814 A1   Aug. 24, 2023

(51) Int. Cl.
*H04W 76/25*   (2018.01)
*H04L 1/08*    (2006.01)
*H04W 52/14*   (2009.01)
*H04W 52/36*   (2009.01)

(52) U.S. Cl.
CPC .............. *H04W 76/25* (2018.02); *H04L 1/08* (2013.01); *H04W 52/146* (2013.01); *H04W 52/365* (2013.01)

(58) Field of Classification Search
CPC ...... H04L 1/08; H04W 28/02; H04W 52/146; H04W 52/365; H04W 52/367; H04W 76/25
See application file for complete search history.

(56) References Cited

U.S. PATENT DOCUMENTS

2020/0178331 A1   6/2020   Xu
2021/0051611 A1   2/2021   Xu
(Continued)

FOREIGN PATENT DOCUMENTS

CN   110366257 A   10/2019
CN   111034337     4/2020
(Continued)

OTHER PUBLICATIONS

Extended European Search Report for EP Patent Application No. 21878757.0; 13 pages; Aug. 26, 2022.
(Continued)

*Primary Examiner* — Donald L Mills
(74) *Attorney, Agent, or Firm* — Kowert, Hood, Munyon, Rankin & Goetzel, P.C.

(57) ABSTRACT

This disclosure relates to techniques for performing wireless communications in a manner to provide enhanced reliability protections at certain times and/or for particular communications, e.g., to maintain or restore operation of an application following a communication failure. Among various possibilities, in order to enhance reliability any of the following actions may be taken: transmission power may be boosted, one or more timer duration may be adjusted, data may be recovered and/or duplicated using a different and/or additional entity, and/or grant selection may be adjusted.

11 Claims, 6 Drawing Sheets

(56) References Cited

U.S. PATENT DOCUMENTS

| | | | |
|---|---|---|---|
| 2021/0235399 A1* | 7/2021 | Wich | H04W 28/0268 |
| 2022/0053509 A1* | 2/2022 | Bulakci | H04W 28/0268 |
| 2022/0182185 A1* | 6/2022 | Bostrom | H04L 41/5009 |
| 2022/0264354 A1* | 8/2022 | Kela | H04L 1/08 |
| 2023/0189055 A1* | 6/2023 | Tooher | H04W 28/0268 370/328 |

FOREIGN PATENT DOCUMENTS

| | | | |
|---|---|---|---|
| WO | 2020167231 A1 | 8/2020 | |
| WO | 2021032279 A1 | 2/2021 | |

OTHER PUBLICATIONS

Nokia et al. "Summary of Agenda Item 8.5.4: RAN enhancements based on new QoS"; 3GPP TSG-RAN WG2 Meeting #113e R2-2102254; Elbonia, 5 pages; Jan. 25-Feb. 5, 2021.

CATT "Handling of Survival Time"; 3GPP TSG-RAN WG2 Meeting #113bis-e R2-2102726; 7 pages; Apr. 12-20, 2021.

CATT "Discussion on Survival Time"; 3GPP TSG-RAN WG2 Meeting #113-e R2-2100223; 8 pages; Jan. 25-Feb. 5, 2021.

Qualcomm Inc "New values for RLC and PDCP timers-Open issue and capabilities"; 3GPP TSG-RAN WG2 Meeting #109-e R2-2001332; 3 pages; Feb. 24-Mar. 6, 2020.

International Search Report and Written Opinion for PCT/CN2021/089163; 9 pages; Jan. 12, 2022.

LG Electronics "View on survival time mechanisms"; 3GPP TSG-RAN WG2 Meeting #113-bis electronic online R2-2104097; 3 pages; Apr. 20, 2021.

Vivo "Discussion on RAN enhancement to support survival time"; 3GPP TSG-RAN WG2 Meeting #113 electronic E-Meeting R2-2100831; 4 pages; Feb. 5, 2021.

Office Action for CN 202180006061.7; Apr. 1, 2025.

Qualcomm Inc et al. "New values for RLC and PDCP timers" 3GPP TSG RAN WG2 R2-1916183; Nov. 22, 2019.

\* cited by examiner

SURVIVAL TIME COMMUNICATION TECHNIQUES

PRIORITY CLAIM INFORMATION

This application is a U.S. National Stage application of International Application No. PCT/CN2021/089163, filed Apr. 23, 2021, titled "Survival Time Communication Techniques", which is hereby incorporated by reference in its entirety.

TECHNICAL FIELD

The present application relates to wireless communication, including to communications during and/or related to survival time.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be that various applications, services, and/or devices may enter a failure state if expected communications do not occur during a survival time period under various circumstances. Improvements in the field are desired.

SUMMARY

Embodiments are presented herein of, inter alia, systems, apparatuses, and methods for communications during and/or related to application survival time, e.g., in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include improving reliability of communications for or related to applications, services, and/or devices that have a limited survival time.

In some embodiments, a method may comprise: at a first communication device, determining control information comprising: a condition to start an enhanced reliability procedure for an application associated with a user equipment device (UE); and a condition to stop the enhanced reliability procedure for the application. The communication device may determine that the condition to start the enhanced reliability procedure for the application is true; and in response to the determination that the condition to start the enhanced reliability procedure for the application is true, switch from a first communication setting to a second communication setting, wherein the second communication setting is different than the first communication setting. The communication device may exchange data of the application according to the second communication setting and may determine that the condition to stop the enhanced reliability procedure for the application is true; and in response to the determination that the condition to stop the enhanced reliability procedure for the application is true, switch from the second communication setting to the first communication setting. The communication device may exchange data of the application according to the first communication setting.

In some embodiments, a user equipment device (UE) may establish communication with an end point device via a base station and receive configuration information. The UE may determine at least one survival time parameter of a first application executing on the UE and exchange data of the first application (or a connection, flow, etc. related to such an application) via the base station using first communication settings according to the configuration information during a first period of time. The survival time and/or other survival time parameter(s) may be pre-configured (e.g., for the UE) or may be determined based on information exchanged between the UE and network. The UE may detect a start trigger event for the first application (or a connection, flow, etc.). Among various possibilities, the start trigger event may include determining that at least one packet (e.g., transport block, portion of transport block, code block, packet segment, etc.) of data for the first application is not received within a first time period according to the at least one survival time parameter of the first application. In response to detecting the start trigger event for the first application, the UE may use second communication settings to exchange data of the first application via the base station during a second period of time subsequent to the first period of time. The UE may detect a stop trigger event at a third time subsequent to the second period of time; and, in response to detecting the stop trigger event, exchange data of the first application via the base station using the first communication settings.

In some embodiments, a first communication device may be configured to exchange data of a first application with a second communication device according to a first level of reliability. The first communication device may determine that an exchange of data of the first application with the second communication device has been interrupted. In response to the determination that the exchange of data of the first application with the second communication device has been interrupted, the first communication device may determine that the first application has entered survival time: start a survival time timer associated with the first application; and determine to temporarily exchange data of the first application with the second communication device according to a second level of reliability higher than the first level of reliability while the survival time timer is running.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description. Figures. and Claims.

BRIEF DESCRIPTION OF THE DRAWINGS

A better understanding of the present subject matter can be obtained when the following detailed description of the embodiments is considered in conjunction with the following drawings.

Figure 1:
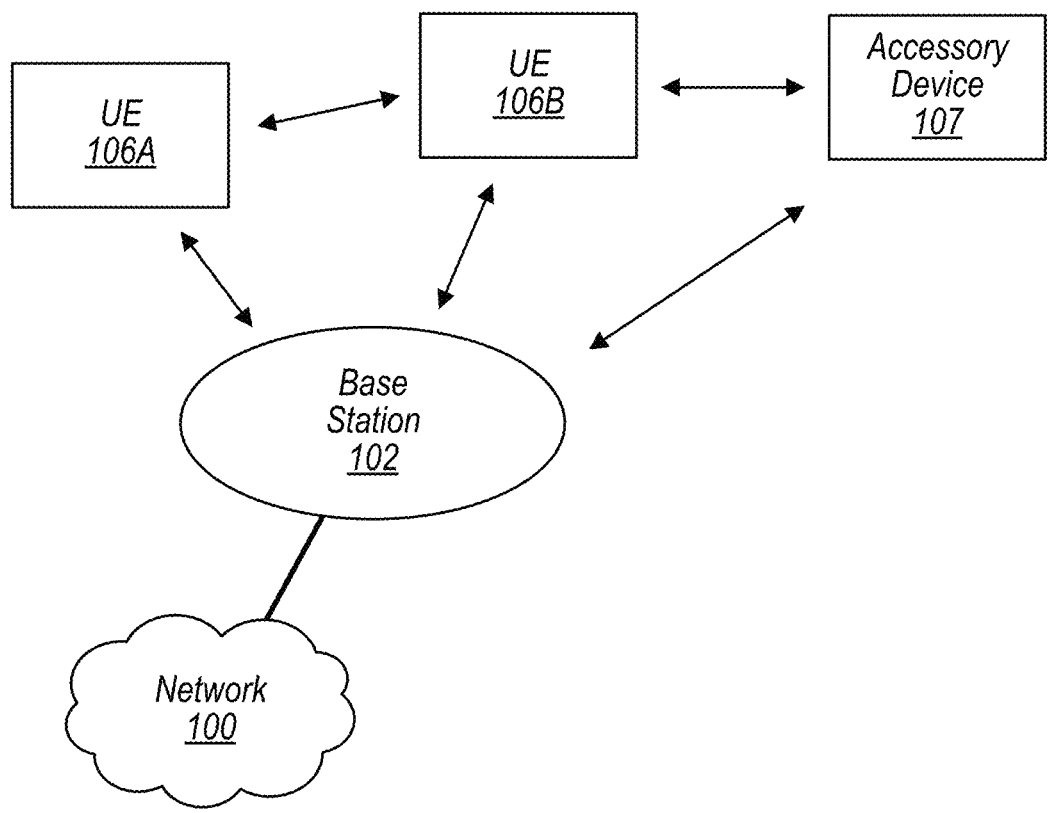
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
NR: New Radio
LTE: Long Term Evolution
RRC: Radio Resource Control
MAC: Media Access Control
CE: Control Element
RS: Reference Signal
CSI: Channel State Information
DL: Downlink
UL: Uplink
BS: base station
NW: network
RAT: radio access technology
AMF: access and mobility management function
MME: mobility management entity
URLLC: ultra reliable low latency communication

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device: a computer system memory or random access memory such as DRAM, DDR RAM, SRAM, EDO RAM, Rambus RAM, etc.: a non-volatile memory such as a Flash, magnetic media, e.g., a hard drive, or optical storage: registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™. Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless communication system.

Communication Device—any of various types of computer systems or devices that perform communications, where the communications can be wired and/or wireless. A communication device can be portable (or mobile) or may be stationary or fixed at a certain location. A wireless device is an example of a communication device. A UE is another example of a communication device. A base station is another example of a communication device. A network element and/or network function is another example of a communication device. An application server associated with an application is another example of a communication device.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112 (f) interpretation for that component.

Figure 2:
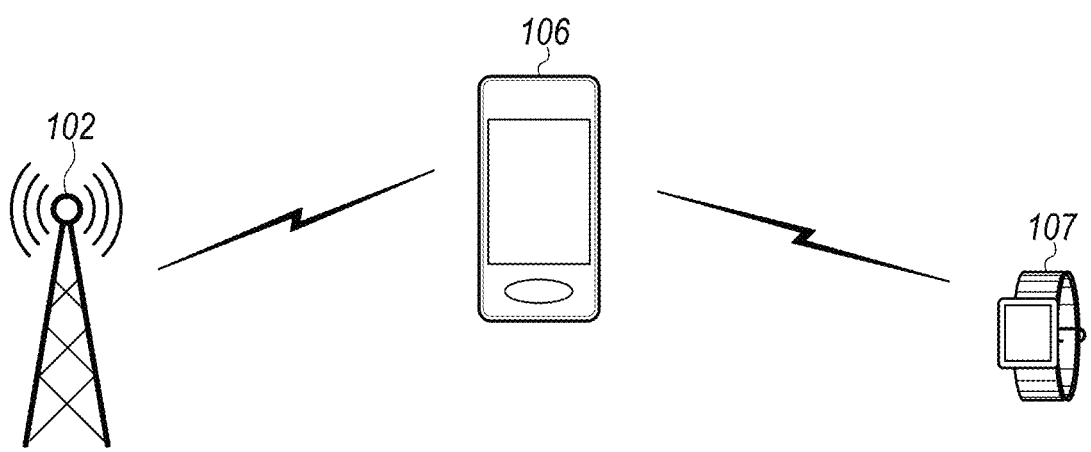
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107.

Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1xEV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions.

Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
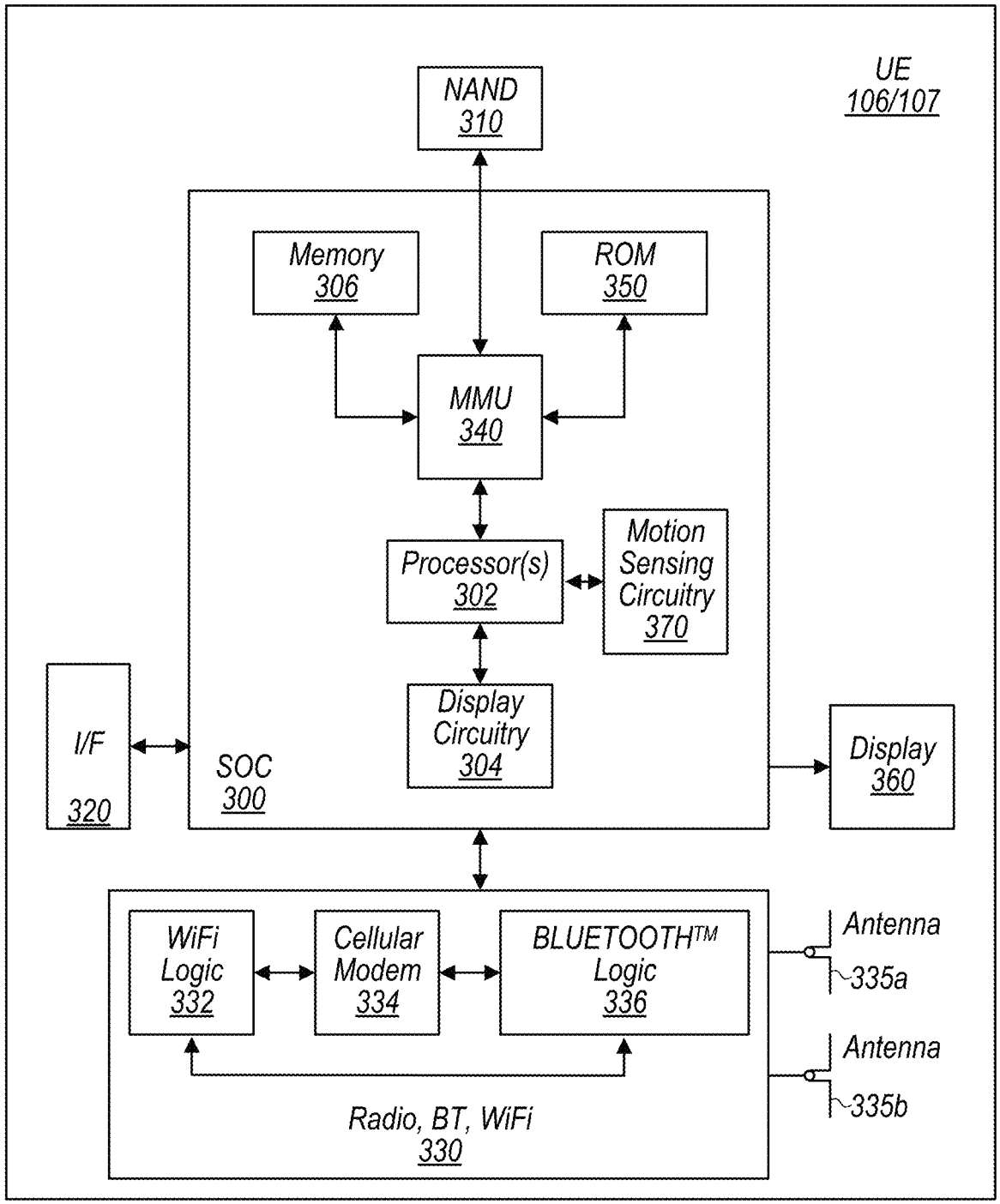
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
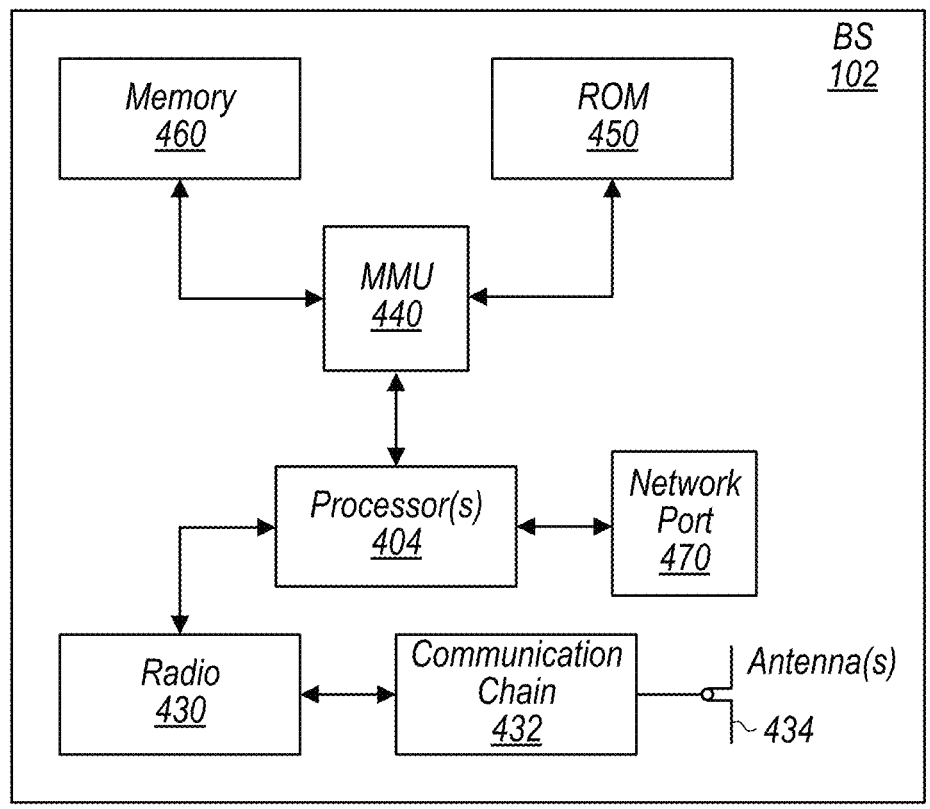
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460) and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470) (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
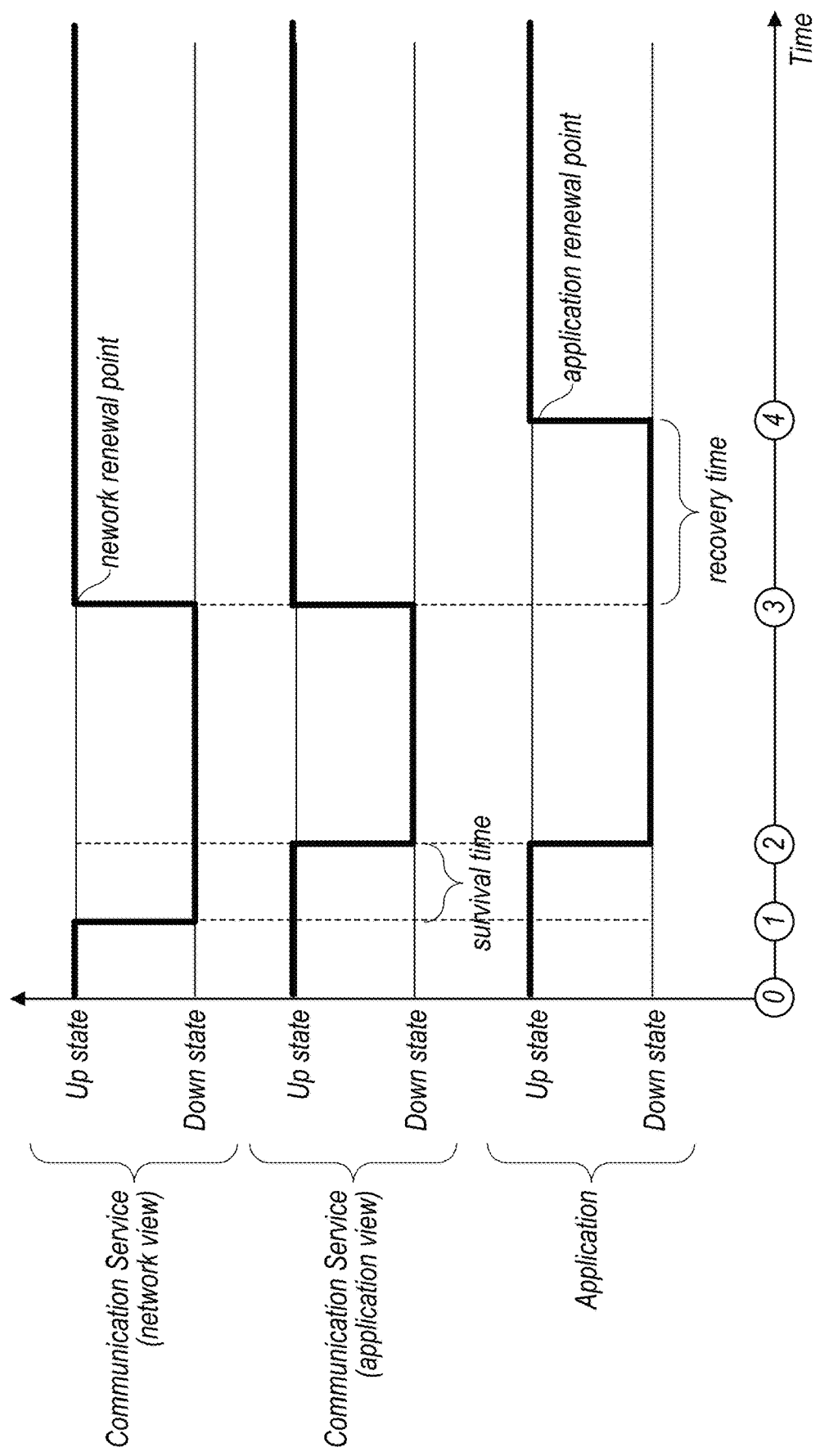
FIG. 5 is a timing diagram illustrating status of communication service and application at different points in time, according to some embodiments.
Figure 6:
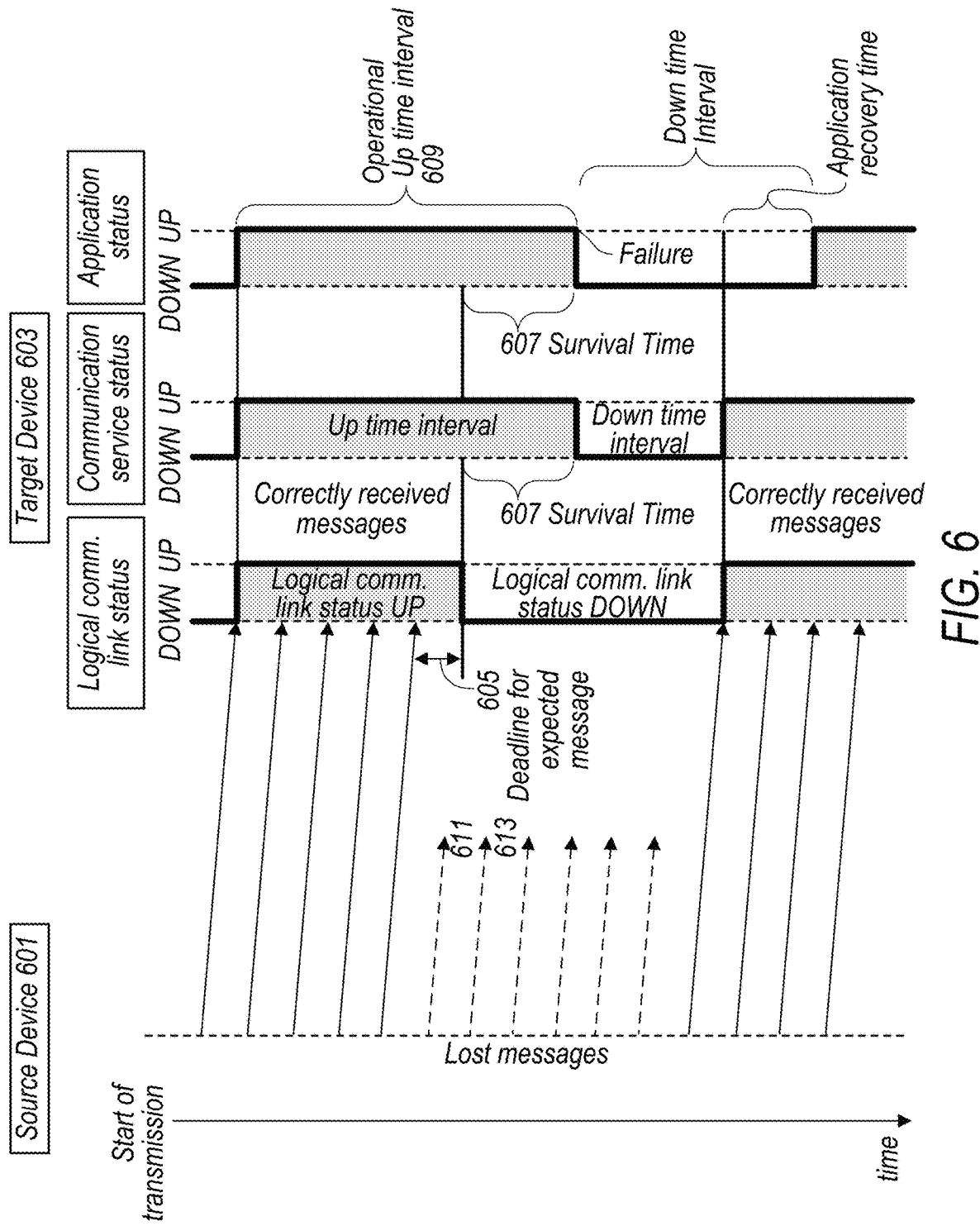
FIG. 6 is a timing diagram illustrating status of communication service and application at different points in time, according to some embodiments.

FIGS. 5 and 6—Application Survival and Recovery Time

3GPP technical specification (TS) 22.104 and technical report (TR) 22.832 may describe application survival time, e.g., for industrial internet of things (IIoT), URLLC, and/or other types of applications such as cyber-physical control applications. For example, TS 22.104 describes survival time as "the time that an application consuming a communication service may continue without an anticipated message". According to TR 22.832 survival time may indicate to the communication service the time available to recover from message delivery failures. The survival time may be expressed as a time period which, especially with cyclic traffic, accommodates the maximum number of consecutive incorrectly received or lost messages that can be tolerated without causing an application layer failure.

In some embodiments, for applications that have survival time equal to zero, any loss of packet, transport block (TB), portion of transport block, code block, packet segment, etc. (collectively, "packet/TB") may trigger unavailability, while for applications with non-zero survival time two or more consecutive packet losses may trigger unavailability (e.g., depending on the agreed/configured traffic periodicity and length of the survival time).

Per TS 22.261, communication service availability may be described as a percentage value of the amount of time the end-to-end communication service is delivered according to an agreed quality of service (QOS), divided by the amount of time the system is expected to deliver the end-to-end service according to the agreed QoS in a specific area. The end point in "end-to-end" may be assumed to be the communication service interface, e.g., an interface between an application layer and one or more lower layer. The communication service may be considered unavailable if it does not meet the pertinent QoS requirements. If availability is one of the QoS requirements, the system may be considered unavailable if an expected message is not received within a specified time, which, may be the sum of maximum allowed end-to-end latency and survival time. A greater time may be used, according to some embodiments.

FIG. 5 is a timing diagram, similar to TR 22.832's Figure D.1-1. FIG. 5 illustrates communication service status and application layer status, e.g., for a particular "first" application executing on the UE. The application may rely on exchange of data/information between the UE and another end point device e.g., a different UE, an application server associated with the first application, etc.). In other words, the application may use end-to-end communication, in which one end is the UE and the other end is another end point device.

An up state may indicate that the communication service or application is operating normally while the down state may indicate that the service or application is not operating normally. For example, a down state may occur because (e.g., or while) the first application executing on the UE and/or a counterpart application executing on a remote end point device has not received some expected information, e.g., transmitted by the other end. For example, if a packet/TB is not exchanged (e.g., from end to end) within a time (e.g., according to a parameter of the application), the first application may enter a down state. The application status may be viewed at either or both "ends" of the communication, e.g., at the UE or a corresponding server or second UE, e.g., the other end point. For example, application layer "up state" and "down state" may described in the 3GPP specifications.

As illustrated in FIG. 5, at time (0)) the communication service and the first application may be in the up state, e.g., operating normally. The first application may be any type of application, e.g., including applications by which one UE interacts with another UE and/or a server associated with the application. For example, such applications may include industrial, cyber-physical control, URLLC, IIOT, voice and/or video calling, gaming, streaming, productivity, health/fitness, other types of real time and/or interactive applications, etc. Various examples of survival time and related concepts may be provided in TS 22.104, 22.263, 22.261, and/or 22.832.

At time (1) a communication service failure may occur in the network (e.g., packet/TB loss of at least one packet/TB of the first application). The packet/TB loss may be for uplink and/or downlink data of the first application. As a result, the network view of the communication service may switch to the down state and the application may enter survival time. A survival time timer may be started (e.g., at either or both end points and/or at a base station and/or network element). It will be appreciated that the UE and the network may continue to communicate while the network view of the communication service is in the down state. For example, the network and the UE may exchange data of the first application and/or other applications.

In some embodiments, an application entering or exiting survival time may be considered to be the same as the UE entering or exiting survival time. For example, a 3GPP communication stack may include or be provided with one or more parameter(s) or variables related to whether "survival time" is in effect for a UE, application, flow, DRB, etc. Similarly, as used herein, a survival time parameter or configuration information (or other parameter/information) related to an application may be consider as a parameter/information for or associated with the UE.

At time (2), the survival time may have elapsed. As a result, the communication service (e.g., from the application view) may also transition to the down state, as may the first application. In other words, as a result of the packet/TB loss being unresolved (e.g., the packet/TB(s) not being delivered) for/during the survival time, the first application may enter a down state. It will be appreciated that in different scenarios (e.g., not illustrated in FIG. 5), that if the packet/TB loss had been resolved during the survival time, that the first application may not enter the down state (e.g., it may remain operating in the up state, thus ending survival time).

At time (3), pay load data (e.g., a previously missed packet/TB or new data) may be delivered for the application (e.g., the failure may be solved). As a result, the communication service may change to the up state, e.g., indicating that pay load data is successfully exchanged. It will be appreciated that the communication service operating in the up state may not imply that the application itself is operating in the up state. For example, a period of "recovery time" may follow time 3 during which the application may use newly (e.g., and/or previously) exchanged data to resume normal operation.

At time (4), e.g., after the recovery time, the application may be restored and may switch to the up state. For example, the application may resume normal operation.

FIG. 6 is a timing diagram illustrating a relation between logical communication link, communication service and application state (example with lost messages) in context of a source device 601 and target device 603. A similar discussion and illustration may be found in TS 22.104, e.g., Figure C.3-1. As shown, an operation interval (e.g., measured at application layer) may end following a maximum end-to-end latency (shown as the deadline 605 which is associated with the first missing message 611) in combination with the survival time 607. In other words, if a transmission from the source device 601 to the target device 603, does not arrive prior to the end of the survival time 607, then the operation up time interval 609 may end. Thus, the deadline 605 may describe the expected arrival time within latency according to QoS. However, the survival time 607 may describe the amount of time that the application can operate normally without the data.

In some embodiments, if the first missing message 611 is delivered during the survival time, the operation interval may continue, e.g., a late delivery of message 611 may allow the application to continue operating normally in the up state.

In some embodiments, delivery of any subsequent message (e.g., message 613, or a later message) from the source device 601 during the survival time (e.g., without delivery of missed message 611) may allow the application to continue operating normally in the up state. For example, if any message is received during survival time, the application may not enter down state and may continue to operate normally. Thus, in some embodiments, if zero message(s) is (are) received during the whole span of survival time, the application may enter the down state after the end of survival time.

Figure 7:
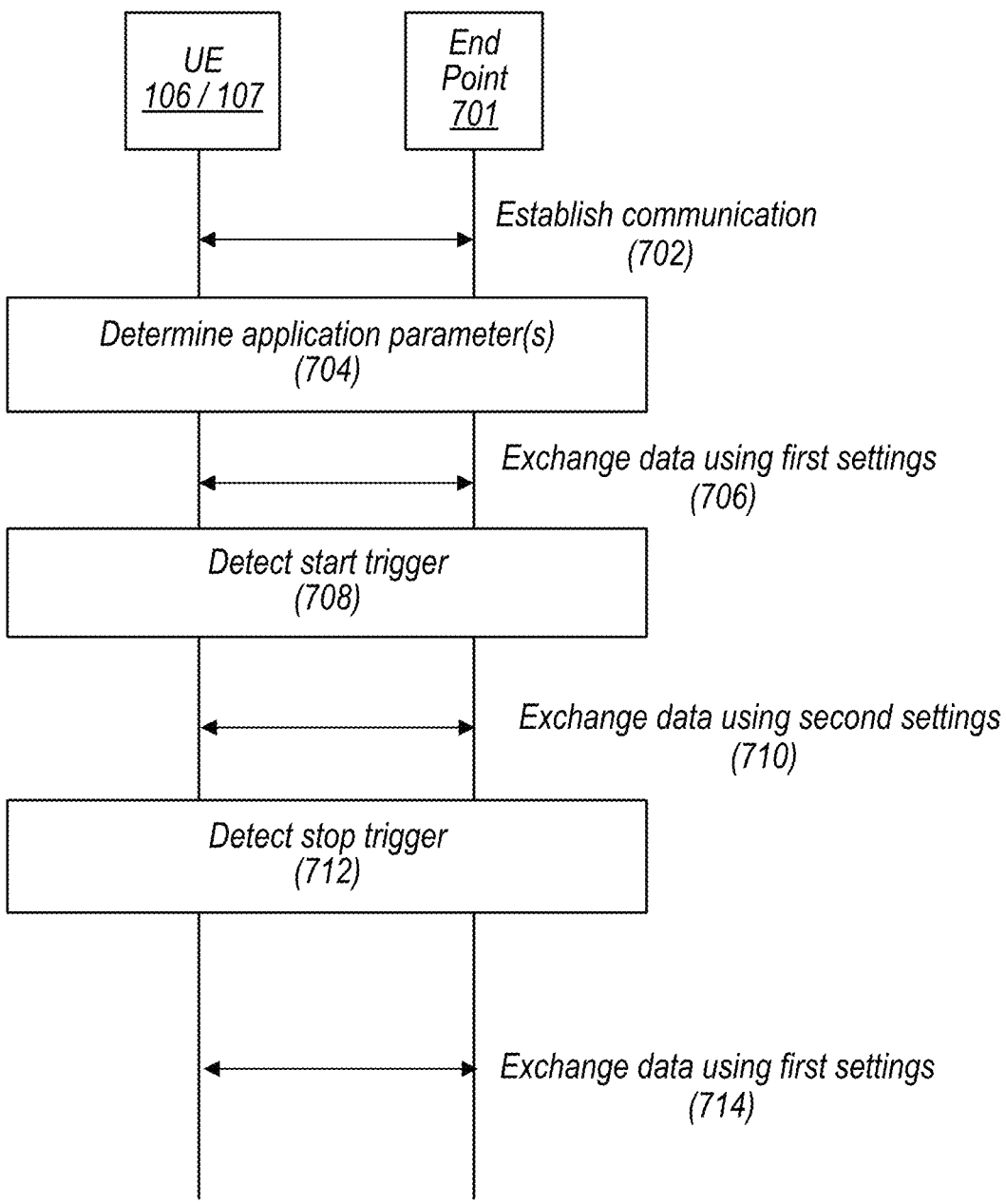
FIG. 7 is a communication flow diagram illustrating an example method for performing communication with improved reliability during survival time, according to some embodiments.

FIG. 7—Enhancing Communication Reliability Protections Temporarily

As shown in FIG. 6 and discussed above, if packet/TB errors are detected and survival time has not yet expired, steps may be taken to ensure delivery of subsequent packet/TBs within survival time. One potential use of survival time may be to temporarily adjust reliability, e.g., the packet error rate (PER), if survival time is in jeopardy. This may be expressed as an if-then condition: if survival time is active, then trigger a suitable method for additional packet/TB protection and/or packet/TB recovery, e.g., as further illustrated in FIG. 7 and discussed below. Such a method may be configurable by the network based on UE capabilities. For example, when applications (e.g., and/or services such as industrial internet of things (IIoT) and/or ultra reliable low latency communication (URLLC) applications) make use of radio link control (RLC) retransmissions or when applications can benefit from protection triggered through higher layers, additional protection methods could be used. Such temporary increases in reliability protections may avoid loss of the communication service by adding extra protection for a) ongoing messages that are in-flight and/or b) new messages, e.g., during survival time.

If a transmission/retransmission is to be made during survival time, it may be beneficial to not just send/resend the data through a similar resource allocation (e.g., as an earlier transmission which was not successfully delivered), but to allow for additional protection and better reliability, e.g., by using a different allocation. This may involve sending the messages via another component carrier or a link with a different PHY configuration (e.g., using a different RAT, etc.).

Thus, if/when a communication device detects the start/end of survival time through any suitable method (e.g., which may be determined either by network configuration or by the UE itself), then the communication device may determine to enter/leave a period of "protected" data transfer, e.g., for a particular application (or service, etc.). In other words, a communication device may monitor for a survival time start event/trigger (e.g., a protected data transfer start event/trigger). In response to detecting such a start event, the communication device may begin a period of enhanced reliability communications, e.g., for the application. Then, the communication device may monitor for a survival time end event/trigger (e.g., a protected data transfer stop event/trigger). In response to detecting such a stop event, the communication device may revert to normal reliability communications for the application. Said another way, in some embodiments, when the application exits survival time (e.g., by resuming normal operations or entering the down state, e.g., depending on whether sufficient data was exchanged to enable normal operations), the enhanced reliability procedures may end. Alternatively, there may be a delay before the enhanced reliability procedures are ended, e.g., for a predetermined length of time, based on error rates reaching a threshold (e.g., an instant error rate or a moving average error rate), etc.

In some embodiments, a new survival time timer may be used at the transmitter side, e.g., as a start trigger to enter and/or exit an enhanced reliability setting/procedure. If a message (or a sequence of 0, 1, . . . . N messages) cannot be transmitted successfully, the transmitter may enter survival time state and start the survival time timer. Subsequent messages may then be sent with higher reliability for as long as the transmitter is in survival state (until the survival time timer expires). The survival time timer start could be associated with or triggered by certain events such as automatic repeat request (ARQ) or hybrid ARQ (HARQ) feedback.

For example, the transmitter may rely on HARQ feedback to determine if it should enter survival time state. For instance, if a single NACK or a re-TX grant is received at MAC layer, the transmitter may enter the survival time state and boost the reliability of later messages. The HARQ ACK/NACK may be used as a start trigger for the TX-side survival time timer.

As another example, the transmitter may rely on ARQ feedback on the RLC layer to determine if it should enter survival time. Or, the transmitter may rely on the message interval for message reception at the application layer.

In some embodiments, a message delivery timer could be started (e.g., restarted) at every successfully transmitted message, and when/if the message delivery timer expires, the transmitter may enter a survival state or high reliability state. In other words, such a message delivery timer may operate to keep the transmitter from switching to enhanced reliability settings, e.g., as long as the message delivery timer does not expire due to too long of a period elapsing between successfully transmitted message. If the message delivery timer expires, the transmitter may enter the survival/high reliability mode for either a pre-defined time or indefinitely (e.g., until a next message is sent successfully).

In some embodiments, a network could signal to the UE a set of conditions when to enter survival time. For example, the UE enters survival time after a certain number of lost (or unsuccessfully transmitted or received messages).

In some embodiments, survival time or an enhanced reliability mode may be entered periodically, e.g., on a preventative basis. For example, the transmitter may enter the enhanced reliability setting automatically after a set number of messages (e.g., every second message, etc.) regardless of feedback (e.g., such that every second message is sent with a higher reliability).

Further, conditions may be also defined based on a specific message layer, like the application layer or based on any of the lower layers. Or based on observance of a certain traffic pattern for a given service. For example, the set number of messages may be determined based on traffic pattern of the service/application.

In some embodiments, a network may also consider a combination of burst arrival time (BAT) (e.g., as described in TSCAI 23.501, clause 5.27.2) and PDB to derive the point in time when survival time starts. In other words, the start trigger condition may depend on BAT.

In some embodiments, the start trigger condition and for how long the UE and/or base station remains in the survival time/enhanced reliability state may be set in standards or otherwise known. For a given service (or QoS flow), the survival time may be known to the network and/or could be preconfigured in the UE. There can be multiple methods to signal the actual duration of the survival time to the UE, for example, through signaling or pre-configuration based on standardized values.

FIG. 7 is a communication flow diagram illustrating an example method for temporarily (e.g., during survival time) enhancing communication reliability protections, according to some embodiments. In various embodiments, some of the elements of the methods shown may be performed concurrently, in a different order than shown, may be substituted for by other method elements, or may be omitted. Additional method elements may also be performed as desired. Aspects of the method of FIG. 7 may be implemented by one or more communication devices such as a UE (e.g., 106 or 107), a BS 102, a cellular network (e.g., network 100), and/or one or more end point devices 701 (e.g., an application server, UE, or other device associated with an application and/or service (collectively "application") exchanging data to/from a UE). Such communication devices may be illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network, network element, BS, application server, end point device, and/or other communication device to perform some or all of the illustrated method elements. Note that while at least some elements of the method of FIG. 7 are described in a manner relating to the use of communication techniques and/or features associated with 3GPP specification documents, such description is not intended to be limiting to the disclosure, and aspects of the method of FIG. 7 may be used in any suitable wireless communication system, as desired. Actions discussed herein as being performed by a base station may be performed by a base station and/or network element of a network. It will be appreciated that although the methods of FIG. 7 are primarily presented in terms of increasing reliability during survival time, these methods may additionally be applied to increasing reliability at other times (e.g., during recovery time and/or application down time). Aspects of the methods of FIG. 7 may enable message protection during survival time through solutions in layer 1 and layer 2, among various possibilities. Any of the UE, BS, application server, end point device, and/or network element may be referred to as communication devices. As shown, the method may operate as follows.

The UE 106/107 and the end point device 701 may establish communication (702), according to some embodiments. The communication may pass through or be facilitated by a cellular network 100 and/or base station 102. In other words, the UE may communicate with a base station which may relay communications to/from the UE through a cellular network from/to the end point device. In some embodiments, the UE and the end point device may communicate directly, e.g., without an intermediate network and/or base station.

The UE 106/107, the end point device 701, network element, and/or a base station may determine one or more parameter(s) of an application, e.g., a "first" application, executing on the UE and/or end point device (704), according to some embodiments. As one possibility, the UE and/or end point may provide information about the application, such as an indication of the one or more parameter(s) of the application, to the base station/network element. The base station and/or network element may determine the parameter(s) based on such an indication.

The application may be or include URLLC, IIoT, cyber-physical control, voice and/or video calling, gaming, streaming, productivity, health/fitness, other types of real time and/or interactive applications, etc. These example application types are non-limiting and other types of applications may be used as desired. Normal operation of the application may include exchanging data between the UE and the end point device.

It will be appreciated that an application executing on the UE may be different than, but related to, a counterpart application executing on the end point device. For example, the UE may transmit measurement data to the end point device and/or the end point device may transmit instructions (e.g., for a device controlled by or connected to the UE) to the UE. Thus, the application on the UE and the counterpart application on the end point device may be connected in their operation, e.g., they may be designed to operate together. For convenience herein, the application at the UE and the counterpart application at the end point device may be referred to together/collectively as the application, the first application, an application, etc. Such terms may be understood to encompass the application at the UE and the counterpart.

In some embodiments, normal operation of the application may include exchanging data directly with a second UE (e.g., without transmission over/through a network). For example, the application may be a device-to-device (e.g., ProSe) application.

The parameters may include characteristics of communication of the application, e.g., periodicity, volume of data, determinism, etc.

The parameter(s) may include information related to a survival time and/or other Qos related information such as the packet delay budget (PDB) of the application or service. For example, survival time may start after a PDB has expired. For example, the parameter(s) (e.g., a survival time) may describe the amount of time that the application may continue to operate (e.g., remain in an up state) after an interruption in communications. For example, a survival time parameter may be expressed as a period of time or a number of cycles of a periodic communication (e.g., a maximum number of consecutive incorrectly received or lost messages). Such a survival time parameter may depend on various factors. For example, a survival time parameter may differ depending on whether an uplink or downlink communication is missed. In some embodiments, the survival time may depend on a type of communication that is missed, e.g., one type of data may be more critical to the application than another type of data, and a survival time may depend on the type of data that is missed. In some embodiments, the survival time may depend on an amount of data that is missed, e.g., missing only one packet. TB, protocol data unit (PDU), etc. may result in a longer survival time than missing multiple packet/TBs or PDUs. In some embodiments, the survival time may not depend on such factors as the amount of data that is missed or type of data missed.

In some embodiments, the parameter(s) may relate to one or more connection, QoS flow, 5QI, data radio bearer (DRB), and/or logical channel (LCH), etc., e.g., which may be associated with the first application or service. In some embodiments, the parameter(s) may apply to the entire connection, flow, 5QI DRB, LCH, etc., which may include traffic of multiple applications/services.

The UE 106/107, the end point device 701, network element, and/or a base station may exchange configuration information, e.g., related to the application/service (e.g., or connection, flow, 5QI, DRB, and/or LCH). In some embodiments, the configuration information may be based on the parameters of the application and/or the parameters of the application may be determined based in part on the configuration information. The configuration information may include configuration for communication of data of the application. The configuration information may include measurements, capability information, etc.

As one possibility, the base station and/or network element may provide configuration information to the UE for a plurality of links or paths between the UE and the network. The plurality of links may include different entities at various layers, e.g., at the packet data convergence protocol (PDCP) and/or radio link control (RLC) layers. For example, two links may share a common entity at the PDCP layer and different RLC entities. Among various possibilities, different links may be associated with different cells, cell groups, component carriers, and/or RATs. For example, using dual connectivity, one link may be associated with LTE while another may be associated with NR or two links associated with the same RAT may use different (e.g., completely distinct or overlapping) component carriers, etc. Primary and/or split secondary RLC entities (e.g., as described in TS 38.323/37.340 and configured by RRC) may be used for various links. One or more split bearers may be configured. PDCP duplication may or may not be used.

As another possibility, the base station and/or network element may provide configuration information to the UE for a plurality of communication profiles or settings. One or more of the communication profiles (e.g., set of communication settings) may be associated with the application (e.g., and/or connection, flow, 5QI, DRB, and/or LCH). In some embodiments, one communication profile may be a default profile, e.g., for use during normal operation of the application. Another communication profile may be a survival time profile, e.g., for use during survival time to temporarily enhance reliability of the application (e.g., and/or connection, flow, 5QI, DRB, and/or LCH). Various examples are described below.

For example, the configuration may include associations between various RLC entities and/or links. For example, a first RLC entity may be configured as a primary RLC entity for an application (e.g., and/or connection, flow, 5QI, DRB, and/or LCH) according to a primary or default profile/setting. Further, a second/extra RLC entity (e.g., or more RLC entities) may be configured, according to a second profile/setting as secondary for the application (e.g., and/or connection, flow, 5QI, DRB, and/or LCH), e.g., to use during survival time as discussed further below. For example, an RLC entity associated with one cell group may be configured as a default RLC entity, and a second RLC entity may be configured as a backup or extra RLC entity which the UE may autonomously begin to use in response to a start trigger condition. It will be appreciated that RLC entities may be associated with DRB and/or LCH. For example, the first/primary RLC entity may be associated with a DRB and the second/extra RLC entity may also be associated with the DRB.

As another example, a first setting/profile may be associated with a first level of duplication (e.g., PDCP duplication) and a second setting/profile with a higher level of duplication for use as needed (e.g., in response to a survival time condition).

As another example, a first setting/profile may be associated with a first timer value or set of timer values (e.g., RLC timers such as T-StatusProhibit and/or T-PollRetransmit, which are discussed in TS 38.331 and 38.332) and a second value or set of values for the (e.g., same) timer(s) may be configured for use as needed (e.g., in response to a survival time condition).

As another example, the base station and/or network element may provide various configured uplink grants to the UE. The grants may have different characteristics and/or be associated with different applications (e.g., and/or connections, flows, 5QIs, DRBs, and/or LCHs). For example, the different grants may have different levels of reliability in terms of a number of repetitions of uplink data transmitted according to the configured uplink grant: a modulation and coding scheme associated with the configured uplink grant; and/or frequency hopping associated with the configured uplink grant. Thus, the UE may be able to choose between these grants, e.g., according to conditions such as whether or not the application is in survival time. For example, the UE may use one grant that is more efficient in terms of energy use or data rate during normal operations and a different grant that is more reliable, has lower latency, and/or has higher redundancy during survival time.

As another example, the base station and/or network element may provide configuration information to the UE related to various transmit power levels. For example, a default transmit power level and/or one or more pre-configured step increase in power level may be indicated. Similarly, the configuration information may indicate one or more schemes for increasing power level of a particular transmission, e.g., by dropping other transmissions, transmitting over particular links (e.g., with better power headroom, etc.).

The UE 106/107 and the end point 701 may exchange data for the first application (e.g., and/or connection, flow, 5QI, DRB, and/or LCH) (706), according to some embodiments. The exchange of data may include uplink and/or downlink transfers. The UE and the end point (and/or any intermediate communication device, such as a base station) may use default settings for the exchange of data. Uplink and/or downlink control information may be exchanged.

The UE 106/107, end point 701, network element, and/or base station may detect a start trigger, e.g., a survival time start event/trigger to temporarily enhance reliability of communications for the first application (e.g., and/or connection, flow, 5QI, DRB, and/or LCH) (708), according to some embodiments. In other words, a communication device may determine that a start trigger condition for enhanced reliability is met or that survival time has started for an application, e.g., according to a survival time parameter of the application. For example, the UE, end point, and/or base station may determine that a communication of application data was missed or interrupted, e.g., at least one packet was not successfully transmitted in the uplink or downlink direction. As a result of the interruption or missed data, survival time may start and a survival time timer may be started. As another example, HARQ or ARQ may be used, e.g., a transmitter may detect a survival time start trigger if no ACK is received and/or one or more NACK is received. As a result of the NACK and/or missed ACK, survival time may start and a survival time timer may be started.

The start trigger condition may include that a packet delay budget (PDB) timer associated with the missed/interrupted data has expired or a message delivery timer associated with a previous packet/TB has expired, e.g., that a deadline for the expected message at the receiving communication device (e.g., UE, base station, second UE, application server, etc.) has passed. The start trigger condition may include that at least a threshold number of packet/TBs/communications has been missed. The start trigger condition may be based on the application (e.g., and/or connection, flow, 5QI, DRB, and/or LCH) parameter(s).

In some embodiments, the start trigger condition(s) may depend on QoS. For example, if the QoS is more stringent, the start trigger may be reached sooner (e.g., after a single HARQ NACK even though the application layer message may be split into several smaller TBs) relative to a more lenient QoS (e.g., which may be associated with a start trigger of multiple NACKs, e.g., corresponding to the entire application layer message). For example, when the application enters survival time may depend on a required QoS of the application.

In some embodiments, the start trigger may be prospective, e.g., the start trigger may be detected prior to (or without) entering survival time. For example, a start trigger may include that a particular message requires special protections or that if an upcoming message fails the application may enter survival time.

In response to detecting the start trigger, the UE, end point, network element, and/or base station may use second settings (e.g., a second profile) for further communication (710), according to some embodiments. The second settings may provide for enhanced reliability of communication of data of the application (e.g., and/or connection, flow, 5QI, DRB, and/or LCH). The second settings may be used temporarily, e.g., during survival time, e.g., while a survival time timer is running. In other words, the communication device(s) may switch to an alternative communication profile to provide a higher level of reliability while conditions associated with the start trigger are in effect.

Any of the communication devices may independently switch to using the second settings, e.g., the UE, network element, end point, and/or base station may initiate use of the second settings autonomously. In some embodiments, any of the communication devices may transmit an indication to the other communication device(s) of the (e.g., upcoming) switch to the second settings. Various examples of the second settings are described below.

In some embodiments, a communication device that determines that the application is entering survival time may transmit an indication that the application is entering survival time to an additional communication device(s). For example, a UE may transmit such an indication to a base station, end point, or network element and/or vice versa. In response to receiving such an indication, the receiving communication device may use second communication settings or otherwise take action to improve reliability of communications for the application (e.g., and/or connection, flow, 5QI, DRB, and/or LCH) as variously described herein. In some embodiments, a communication device may enter survival state autonomously, and not provide further communication to an additional communication device.

In some embodiments, the second settings may be applied only to data (and/or control) communications of the application (e.g., and/or connection, flow, 5QI, DRB, and/or LCH). In other words, the second settings may be specific to the application (e.g., and/or connection, flow; 5QI, DRB, and/or LCH). For example, the settings may be for a DRB or QoS flow, e.g., associated with the application or service. Thus, the second settings may not be applied to communications of other applications (e.g., and/or connection, flow, 5QI, DRB, and/or LCH) (e.g., of the UE). In some embodiments, the second settings may be applied to all traffic to/from the UE, e.g., for an industrial UE that may only execute a single application.

In some embodiments, any or all of the communication device(s) may start a survival time timer associated with switching to the second settings. The survival time timer may indicate a maximum amount of time that the device(s) may use the second settings before reverting to default settings. In other words, expiration of the survival time timer may be a stop trigger, e.g., triggering a reversion to the default settings. The survival time timer may indicate the amount of time that the application may remain in survival time. Thus, after the application exits survival time (e.g., whether by closing, beginning a recovery process, entering a down state, or resuming normal operation), the device(s) may revert to default settings.

In some embodiments, a reversion timer started upon switching to the second settings and used as a stop trigger, e.g., to trigger an end of the period that the second settings are used and/or a reversion to default settings may be different than the survival time timer. Such a reversion timer may be longer or shorter than the survival time timer. For example, a reversion timer may include a period of down time and/or recovery time of the application.

Increase Power

In a first example, a transmitting communication device (e.g., the UE for uplink transmissions, the base station for downlink transmissions, or both) may increase transmission power during survival time, e.g., to achieve a higher reliability. For example, to increase the probability of an uplink transmission to succeed, a UE may increase its output power, e.g., during survival time or when special message protection is required.

In some embodiments, semi-static or dynamic power boosting may be applied. For example, power may be increased according to a pre-configured step (e.g., 1 dB, etc.). The pre-configured step may be indicated in configuration information.

In some embodiments, power may be further increased during survival time, e.g., a series of increasing power levels may be used over time.

In some embodiments, selectively dropping other transmissions (e.g., on other links) may be performed, and thus may increase the power budget of transmissions of the application (e.g., and/or connection, flow, 5QI, DRB, and/or LCH). For example, a UE may autonomously drop or delay an uplink transmission not associated with the application (e.g., and/or connection, flow, 5QI, DRB, and/or LCH), and thus may have more transmit power for an uplink transmission of data of the application (e.g., and/or connection, flow, 5QI, DRB, and/or LCH). In other words, to boost the power of a transmission an uplink packet/TB, the UE may not transmit (drop) or defer the transmission of a packet/TB that is not associated with the application (e.g., and/or connection, flow, 5QI, DRB, and/or LCH) and may use resources available because of the dropped transmission for the boosted transmission.

In some embodiments, a packet/TB may be transmitted over a link with the best power headroom. For example, if multiple links are configured the communication device may select a link with the best power headroom and use that link for a transmission of data of the application (e.g., and/or connection, flow, 5QI, DRB, and/or LCH). Similarly, the communication device may select a link with other desirable characteristics (e.g., best signal to noise ratio, lowest interference, etc.) and use such a link for the transmission.

In some embodiments, the base station or network may distribute grants and/or radio resources differently and may thus improve the power available for transmissions of data of the application (e.g., and/or connection, flow, 5QI, DRB, and/or LCH). For example, by giving more resources to any application(s), connection(s), flow(s), 5QIs, DRBs, and/or LCHs in survival time and limiting resources for others (e.g., which are not in survival time or associated with the application), the UE may have more power available for protected transmissions (e.g., of the application and/or connection, flow; 5QI, DRB, and/or LCH).

RLC Timers and Retransmission

In scenarios with sufficiently long PDB and/or survival times, the use of RLC retransmissions may be an option for enhancing reliability. Among other things, RLC retransmissions may be controlled by timers, e.g., T-StatusProhibit and T-PollRetransmit timers. Thus, when a higher level of message protection (e.g., reliability) is required for a DRB, shorter RLC retransmission intervals may be used. However, such shorter retransmission intervals may be used only temporarily (e.g., in response to detecting the start trigger, as described above) in order to save power, according to some embodiments.

For example, a UE may be configured (e.g., by the base station or network) with two sets of values for one or more RLC timer(s), e.g., set 1 and set 2. The different sets may include different duration values for the (e.g., same) timer(s). For example, the timer(s) may be/include T-StatusProhibit and T-PollRetransmit. Set 1 may be the default value (e.g., associated with a default profile or setting). Set 2 may enable higher message protection, for example, during survival time (e.g., set 2 may be associated with a higher reliability profile/setting). Set 2 may have shorter timer values. Thus, set 2 may be applied in response to the start trigger. As a result of using the shorter timer value, one or more (e.g., additional) retransmission messages may be transmitted by either (or potentially both) communication device while the set 2 timer values are in effect.

In some embodiments, only one timer may have different values between set 1 and set 2. In some embodiments, multiple timers (e.g., all of the timers) may have different values between the sets.

It will be appreciated that the update of RLC timer values typically involves a radio resource control (RRC) reconfiguration, according to some embodiments. However, RRC reconfiguration of the link may be slow and may require extra resources for the signaling. Instead, as noted above, the different timer values may be pre-configured (e.g., the network may indicate pre-defined mapping for the periods with added protection). With such an approach, no additional (dynamic) signaling is required to update RLC timer values. In other words, in response to detecting the start trigger event, the communication devices may switch to the set 2 timer values without RRC reconfiguration.

3GPP release 16 may allow, e.g., through UE capabilities extendedT-StatusProhibit-r16 and extendedT-PollRetransmit-r16 for shorter values of T-StatusProhibit and TPollRetransmit. These values may be applicable especially for IIoT. The UE and base station/network may exchange capability information about these timers, and may use such information in configuring sets of RLC timer values, e.g., as described above.

PDCP Based Methods

In some embodiments, PDCP methods may facilitate providing higher reliability temporarily, e.g., during survival time.

In one PDCP based method, PDCP data recovery over a different RLC entity may be performed. The PDCP protocol may contain a data recovery procedure where, upon request from upper layers, a retransmission of PDCP data PDUs (e.g., previously submitted to one or more re-established or released acknowledged mode (AM) RLC entities) may be performed. For example, one or more PDCP PDUs that are currently in-flight (and/or previously sent) may be resubmitted to lower layers for retransmission. Thus, this recovery procedure may be extended such that (e.g., based on the start trigger), PDCP PDUs may be resubmitted to a RLC AM entity on a link different from the link used for the original/previous transmission. In other words, switching from the first communication setting to the second communication setting may include retransmitting a first packet/TB of data of the application (e.g., and/or connection, flow, 5QI, DRB, and/or LCH) on a second path different from a first path on which the packet/TB was previously transmitted. The first and second paths may have different RLC entities.

In some embodiments, the different link may include an RLC entity associated with another component carrier (CC) or another cell group. It may be a primary or split secondary RLC entity.

For example, as described above, multiple links may be pre-configured. An association between RLC entities may also pre-configured, e.g., in the configuration information. Thus, according to the association between the RLC entities, both the transmitting and receiving configuration device may determine which link or links will be used for retransmission of a packet/TB previously transmitted on a first link. For example, a packet/TB may be transmitted on a link on a master cell group (MCG) prior to entry into survival time and the packet/TB may not be successfully received. Then, based on the start trigger and according to an association of respective RLC entities, the transmitting communication device may resubmit and/or retransmit the packet/TB on a link of a secondary cell group (SCG) based on the start trigger and according to the association of the respective RLC entities. In some embodiments, the receiving communication device may expect retransmission on the SCG. e.g., based on the start trigger and association(s) of the RLC entities.

In some embodiments, the resubmission/retransmission may occur in ascending order of the associated COUNT values for which the successful delivery has not been confirmed by lower layers.

In some embodiments, this PDCP recovery procedure may be applied to split bearers (e.g., in dual connectivity). In some embodiments, PDCP duplication may not be active/used.

In some embodiments, RLC unacknowledged mode (UM) may not be currently eligible for PDCP data recovery, e.g., according to current standards. However, in some embodiments, in response to the start trigger (e.g., during survival time) a packet/TB transmitted in UM may be repeated on a different link, e.g., as described above. In other words, PDCP data recovery may be applied (e.g., autonomously by either or both communication device(s)) in UM in response to detecting the start trigger. For example, the last PDCP PDU (or up to a configurable number of PDCP Data PDUs) that were transmitted prior to the start trigger may be retransmitted by the transmitting communication device, e.g., on a different link than the previous transmission(s).

In some embodiments, this PDCP recovery procedure may be applied in response to a determination that data of the application (e.g., and/or connection, flow, 5QI, DRB, and/or LCH) can be transmitted for longer than the PDB (e.g., without being discarded).

In another PDCP based method, increased PDCP duplication may be applied. For example, if PDCP duplication is already active, a transmitting communication device may increase the number of copies submitted to lower layers for transmission. For example, the transmitting device may go from 2 copies to 4 copies, among various possibilities. This approach may imply a pre-configuration of additional RLC entities that the UE can autonomously use, e.g., in response to the start trigger. Thus, the transmitting device may transmit the additional copies on the pre-configured additional RLC entities and the receiving communication device may expect/receive the copies on those additional entities.

In some embodiments, if PDCP duplication is not active, the communication devices may enable it for a limited period of time or on a per-packet/TB basis, e.g., in response to the start trigger.

Selecting Configured Grants

In some embodiments, when multiple overlapping configured grants (CG) and when LCH-based prioritization is not configured, a UE may select one of the configured grants to create a single media access control (MAC) PDU. Such overlapping grants may occur on the same Component Carrier (CC). The CG may be uplink grants and/or downlink grants.

In response to the start trigger, a UE may select a CG associated with the application (e.g., and/or connection, flow; 5QI, DRB, and/or LCH). For example, the UE may select a CG that is linked to a LCH or DRB that is in survival time. In other words, the UE may determine that a first uplink CG is associated with the application (e.g., and/or connection, flow, 5QI, DRB, and/or LCH) and that the second uplink CG is not associated with the application (e.g., and/or connection, flow, 5QI, DRB, and/or LCH). Thus, switching from the first communication setting to the second communication setting may include selecting the first uplink CG and transmitting data of the application (e.g., and/or connection, flow, 5QI, DRB, and/or LCH) according to the first uplink CG. The UE may further determine not to transmit according to the second uplink CG. Note that there may be more than two multiple overlapping configured grants, and a similar selection approach may apply. Moreover, the UE may apply a similar approach to selecting downlink CGs. The network/base station may also use the same approach for selecting which CG to use to transmit downlink data or receive uplink data from the UE, according to some embodiments.

Further, if multiple overlapping CGs are linked to the same LCH, the UE may select the CG with higher protection. For example, the UE may determine that a first CG is associated with higher reliability than a second CG, and, in response may select the first CG for transmission and/or reception of data of the application (e.g., and/or connection, flow, 5QI, DRB, and/or LCH). As one possibility, the UE may consider one or more parameters of ConfiguredGrantConfig to select a CG with the best reliability or best protection. Parameters of relatively high importance for such consideration may include any or all of frequency Hopping, mcs-Table, repK-RV, repK, mcsAndTBS, pusch-RepTypeIndicator-r16, frequency HoppingPUSCH-Rep- TypeB-r16, startingFromRV0-r16. Parameters of relevance, but relatively less importance may include any or all of: mcs-TableTransformPrecoder, powerControlLoopToUse, p0-PUSCH-Alpha, transformPrecoder, antennaPort, precoding AndNumberOfLayers, frequency HoppingOffset, cg-nrofPUSCH-InSlot-r16, cg-nrofSlots-r16, and/or startingFromRV0-r16. Additional or different parameters may be used as desired.

In some embodiments, TS 38.321 NOTE 7 may be extended. For example, NOTE 7 may indicate that if a MAC entity is not configured with Ich-basedPrioritzation and if there is overlapping duration (e.g., of PUSCH) of at least two configured uplink grants, it may be up to the UE to choose one of the configured uplink grants. Thus, NOTE 7 may be extended to indicate that, if a LCH has entered survival time or a start trigger has occurred, there are multiple overlapping configured uplink grants, and Ich-basedPrioritization is not configured, then the UE may select a grant associated with a LCH where survival time is in jeopardy.

The UE and the base station may determine that a trigger to stop communicating according to the enhanced reliability procedure is met (712), according to some embodiments.

In some embodiments, the stop trigger may be that the application is up and operating normally, e.g., based on successful exchange of further data of the application (e.g., and/or connection, flow; 5QI, DRB, and/or LCH).

In some embodiments, the stop trigger may be expiration of a timer that was started in response to detecting the start trigger event, entering survival time, or upon switching to the second settings. For example, the stop trigger may be that survival time has ended (e.g., a survival time timer or reversion timer has expired).

In some embodiments, the stop trigger may be that the application has closed or is no longer executing on the UE or other end point device.

In some embodiments, the start trigger condition may still be true when the stop trigger condition is met/true. For example, in the case of a survival time timer expiring, a message that was not successfully delivered (e.g., and led to the start condition being determined as true) may still not have been delivered.

In response to detecting that the stop trigger condition is met, the UE, end point, network element, and/or base station may stop performing the enhanced reliability protections (714), according to some embodiments. For example, in response to determining that the application is up and running normally (or that sufficient data to enable normal operation has been received), the UE, end point, network element, and/or base station may resume use of default settings for the exchange of data of the application (e.g., and/or connection, flow, 5QI, DRB, and/or LCH).

In some embodiments, the communication devices (e.g., end point, base station, network, and/or UE) may adjust one or more default settings of the application (e.g., and/or connection, flow, 5QI, DRB, and/or LCH), e.g., in response to entering survival mode. In some embodiments, such an adjustment may be made in response to entering survival mode a threshold number of times or a threshold number of times within a defined time period, etc. Such adjustments may increase the level of reliability of the default settings, e.g., to reduce future incidences of entering survival time.

In some embodiments, a communication device such as a UE operating according to the method of FIG. 7 may be configured to perform a specific (e.g., single) function/application. Thus, it will be appreciated that references herein to entering survival time or taking other actions for a particular application may be interpreted as performing such actions for such a device.

Additional Information and Embodiments

In a first set of embodiments, a method may comprise: at a first communication device: determining control information comprising: a condition to start an enhanced reliability procedure for a connection associated with a user equipment device (UE); and a condition to stop the enhanced reliability procedure for the connection: determining that the condition to start the enhanced reliability procedure for the connection is true: in response to the determination that the condition to start the enhanced reliability procedure for the connection is true, switching from a first communication setting to a second communication setting, wherein the second communication setting is different than the first communication setting: exchanging data of the connection according to the second communication setting: determining that the condition to stop the enhanced reliability procedure for the connection is true: in response to the determination that the condition to stop the enhanced reliability procedure for the connection is true, switching from the second communication setting to the first communication setting; and exchanging data of the connection according to the first communication setting.

In some embodiments, the first communication device comprises a base station of a cellular network.

In some embodiments, switching from the first communication setting to the second communication setting comprises retransmitting, to the UE, a first packet of data of the connection on a second path different from a first path on which the packet was previously transmitted to the UE.

In some embodiments, the first path comprises a first radio link control (RLC) entity and the second path comprises a second RLC entity different from the first RLC entity.

In some embodiments, the method may further comprise, configuring, for the UE: a first set of timer values associated with the first communication setting; and a second set of timer values associated with the second communication setting.

In some embodiments, the second set of timer values comprises a shorter value for at least one of the following timers relative to the first communication settings: T-StatusProhibit; and T-PollRetransmit.

In some embodiments, switching from the first communication setting to the second communication setting comprises increasing a level of duplication of transmission for at least one packet of data of the connection.

In some embodiments, the first communication device comprises the UE, wherein increasing the level of duplication includes submission to at least one additional radio link control (RLC) entity.

In some embodiments, the first communication device comprises the UE, and the method may further comprise: receiving a first configured downlink grant and a second configured downlink grant, wherein Ich-basedPrioritization is not configured; and determining that the first configured downlink grant is associated with the connection and that the second configured downlink grant is not associated with the connection, wherein switching from the first communication setting to the second communication setting comprises: receiving data of the connection associated with the first configured downlink grant; and determining not to receive according to the second configured downlink grant In a second set of embodiments, apparatus, may comprise: a processor configured to cause a user equipment device (UE) to: establish communication with an end point device via a base station: receive configuration information: determine at least one survival time parameter of a first application executing on the UE: exchange data of the first application via the base station using first communication settings according to the configuration information during a first period of time: detect a start trigger event for a flow associated with the at least one survival time parameter of the first application: in response to detecting the start trigger event for the flow; use second communication settings to exchange data of the flow via the base station during a second period of time subsequent to the first period of time: detect a stop trigger event at a third time subsequent to the second period of time; and in response to detecting the stop trigger event, exchange data of the flow via the base station using the first communication settings.

In some embodiments, using second communication settings comprises boosting a transmit power of the UE for transmitting at least one uplink packet or at least one uplink transport block associated with the first application.

In some embodiments, to boost the transmit power of the UE, the processor is further configured to cause the UE to drop at least one uplink packet or uplink transport block that is not associated with the first application.

In some embodiments, to boost the transmit power of the UE, the processor is further configured to cause the UE to: select a radio link with a best power headroom of a plurality of available radio links; and transmit at least one uplink packet or at least one uplink transport block associated with the first application using the radio link with the best power headroom.

In some embodiments, the configuration information indicates: a default value for a first timer, wherein the first communication settings use the default value for the first timer: and a second value for the first timer, wherein the second communication settings use the second value for the first timer.

In some embodiments, the stop trigger event comprises expiration of a survival time timer that was started in response to detecting the start trigger event for the first application.

In a third set of embodiments, a first communication device, may comprise: a radio; and a processor operably connected to the radio and configured to cause the first communication device to: exchange data of a first application with a second communication device according to a first level of reliability: determine that an exchange of data of the first application with the second communication device has been interrupted; and in response to the determination that the exchange of data of the first application with the second communication device has been interrupted: determine that the first application has entered survival time: start a survival time timer associated with the first application; and determine to temporarily exchange data of the first application with the second communication device according to a second level of reliability higher than the first level of reliability while the survival time timer is running.

In some embodiments, the first communication device is a user equipment device (UE), wherein the processor is further configured to cause the first communication device to: receive a first configured uplink grant and a second configured uplink grant both associated with a logical channel associated with the application: determine that the first configured uplink grant is associated with higher reliability than the second configured uplink grant, wherein to temporarily exchange data of the first application with the second communication device according to the second level of reliability comprises selecting the first configured uplink grant for transmission of data of the first application in response to the determination that the first configured uplink grant is associated with higher reliability than the second configured uplink grant.

In some embodiments, Ich-basedPrioritization is not configured.

In some embodiments, the first communication device is a user equipment device (UE), wherein to temporarily exchange data of the first application with the second communication device according to the second level of reliability comprises, retransmitting at least one transport block over a different component carrier and/or different cell group.

In some embodiments, to temporarily exchange data of the first application with the second communication device according to the second level of reliability comprises, while operating in an unacknowledged mode, repeating at least one previously transmitted packet on a different path.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna: a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a first communication device, wherein the first communication device comprises a user equipment device (UE):
determining control information comprising:
a condition to start an enhanced reliability procedure for a connection associated with the UE; and
a condition to stop the enhanced reliability procedure for the connection;
receiving a first configured downlink grant and a second configured downlink grant, wherein Ich-basedPrioritization is not configured;
determining that the first configured downlink grant is associated with the connection and that the second configured downlink grant is not associated with the connection;
determining that the condition to start the enhanced reliability procedure for the connection is true;
in response to the determination that the condition to start the enhanced reliability procedure for the connection is true, switching from a first communication setting to a second communication setting, wherein the second communication setting is different than the first communication setting, wherein switching from the first communication setting to the second communication setting comprises:
receiving data of the connection associated with the first configured downlink grant; and
determining not to receive according to the second configured downlink grant;
exchanging data of the connection according to the second communication setting;
determining that the condition to stop the enhanced reliability procedure for the connection is true;
in response to the determination that the condition to stop the enhanced reliability procedure for the connection is true, switching from the second communication setting to the first communication setting; and
exchanging data of the connection according to the first communication setting.

2. The method of claim 1, wherein switching from the first communication setting to the second communication setting comprises increasing a level of duplication of transmission for at least one packet of data of the connection.

3. The method of claim 2, wherein increasing the level of duplication of transmission for the at least one packet of data includes submission of the at least one packet of data to at least one additional radio link control (RLC) entity.

4. A first communication device, wherein the first communication device is a user equipment device (UE) comprising:
a radio; and
a processor operably connected to the radio and configured to cause the first communication device to:
exchange data of a first application with a second communication device according to a first level of reliability;
receive a first configured uplink grant and a second configured uplink grant both associated with a logical channel associated with the first application; and
determine that the first configured uplink grant is associated with higher reliability than the second configured uplink grant;
determine that an exchange of data of the first application with the second communication device has been interrupted; and
in response to the determination that the exchange of data of the first application with the second communication device has been interrupted:
determine that the first application has entered survival time;
start a survival time timer associated with the first application; and
determine to temporarily exchange data of the first application with the second communication device according to a second level of reliability higher than the first level of reliability while the survival time timer is running, wherein to temporarily exchange data of the first application with the second communication device according to the second level of reliability comprises selecting the first configured uplink grant for transmission of data of the first application in response to the determination that the first configured uplink grant is associated with higher reliability than the second configured uplink grant.

5. The first communication device of claim 4, wherein Ich-basedPrioritization is not configured.

6. The first communication device of claim 4, wherein the first communication device is a user equipment device (UE), wherein to temporarily exchange data of the first application with the second communication device according to the second level of reliability comprises, retransmitting at least one transport block over a different component carrier and/or different cell group.

7. The first communication device of claim 4, wherein to temporarily exchange data of the first application with the second communication device according to the second level of reliability comprises, while operating in an unacknowledged mode, repeating at least one previously transmitted packet on a different path.

8. An apparatus, comprising:
a processor configured to cause a first communication device, wherein the first communication device is a user equipment device (UE) to:
exchange data of a first application with a second communication device according to a first level of reliability;
receive a first configured uplink grant and a second configured uplink grant both associated with a logical channel associated with the first application; and
determine that the first configured uplink grant is associated with higher reliability than the second configured uplink grant;
determine that an exchange of data of the first application with the second communication device has been interrupted; and
in response to the determination that the exchange of data of the first application with the second communication device has been interrupted:
determine that the first application has entered survival time;
start a survival time timer associated with the first application; and
determine to temporarily exchange data of the first application with the second communication device according to a second level of reliability higher than the first level of reliability while the survival time timer is running, wherein to temporarily exchange data of the first application with the second communication device according to the second level of reliability comprises selecting the first configured uplink grant for transmission of data of the first application in response to the determination that the first configured uplink grant is associated with higher reliability than the second configured uplink grant.

9. The apparatus of claim 8, wherein Ich-basedPrioritization is not configured.

10. The apparatus of claim 8, wherein to temporarily exchange data of the first application with the second communication device according to the second level of reliability comprises, retransmitting at least one transport block over a different component carrier and/or different cell group.

11. The apparatus of claim 8, wherein to temporarily exchange data of the first application with the second communication device according to the second level of reliability comprises, while operating in an unacknowledged mode, repeating at least one previously transmitted packet on a different path.

* * * * *